(12) United States Patent
Maijala et al.

(10) Patent No.: US 8,012,445 B2
(45) Date of Patent: Sep. 6, 2011

(54) METHOD AND APPARATUS FOR MANUFACTURING OF A CALCIUM CARBONATE PRODUCT, THE PRODUCT AND ITS USE

(75) Inventors: Mikko Maijala, Espoo (FI); Roope Maijala, Espoo (FI); Björn Lax, Vasa (FI); Jarmo Tolonen, Valkeakoski (FI); Jeuvo Tjurin, Valkeakoski (FI)

(73) Assignee: FP-Pigments Oy, Espoo (FI)

( * ) Notice: Subject to any disclaimer, the term of this patent is extended or adjusted under 35 U.S.C. 154(b) by 760 days.

(21) Appl. No.: 11/631,325

(22) PCT Filed: Jul. 5, 2005

(86) PCT No.: PCT/FI2005/000313
§ 371 (c)(1),
(2), (4) Date: Jan. 3, 2007

(87) PCT Pub. No.: WO2006/005793
PCT Pub. Date: Jan. 19, 2006

(65) Prior Publication Data
US 2008/0069757 A1 Mar. 20, 2008

(30) Foreign Application Priority Data
Jul. 13, 2004 (FI) ............................... 20040976

(51) Int. Cl.
*C01F 11/18* (2006.01)

(52) U.S. Cl. ........ 423/432; 423/158; 423/160; 423/161; 423/165; 423/430

(58) Field of Classification Search ................. 423/158, 423/160, 161, 165, 430, 432
See application file for complete search history.

(56) References Cited

U.S. PATENT DOCUMENTS

| | | | |
|---|---|---|---|
| 4,133,894 A | 1/1979 | Shibazaki et al. | 423/432 |
| 4,888,160 A | 12/1989 | Kosin et al. | 423/430 |
| 6,761,869 B1 * | 7/2004 | Virtanen | 423/432 |

FOREIGN PATENT DOCUMENTS

| | | |
|---|---|---|
| EP | 0 323 967 | 9/1987 |
| EP | 0 468 719 | 1/1992 |
| WO | WO 92/06038 | 4/1992 |
| WO | WO 98/41475 | 9/1998 |

* cited by examiner

Primary Examiner — Stanley Silverman
Assistant Examiner — Brian Walck
(74) Attorney, Agent, or Firm — James C. Lydon (57) ABSTRACT

A method and apparatus for producing a calcium carbonate product formed of small <100 μm sized separate calcium carbonate particles. Calcium hydroxide is fed through a disintegration and spraying apparatus (14), operating on the principle of a pin mill, into a gas which contains carbon dioxide for precipitating calcium carbonate particles and which is inside a precipitation reactor (10). The temperature in the precipitation reactor is maintained at <65° C.

28 Claims, 6 Drawing Sheets

METHOD AND APPARATUS FOR MANUFACTURING OF A CALCIUM CARBONATE PRODUCT, THE PRODUCT AND ITS USE

The present invention relates to a method and apparatus for producing a calcium carbonate product formed of small calcium carbonate particles. The present invention relates in particular to a method and apparatus for producing precipitated calcium carbonate, whereby calcium hydroxide is fed as small drops and/or particles into a gas which contains carbon dioxide and which is inside a precipitation reactor.

KNOWN TECHNOLOGY

Calcium carbonate is typically produced from a calcium hydroxide sludge by precipitation using carbon dioxide. Traditionally, a batch process is used in production, in which process carbon dioxide gas is fed as fine bubbles into the calcium hydroxide sludge until a proper carbonation level has been achieved. The dry matter content of the calcium hydroxide sludge must thus not be too high, so that the gas bubbles will be able to enter into the sludge. For example, the American patent publication U.S. Pat. No. 4,927,618 suggests that calcium hydroxide sludge with a dry matter content of 7.68% be used. This production method requires a long time for carbonation; it is mentioned in the first example of the US patent that carbonation takes 31 minutes:

On the other hand, it has also earlier been suggested that calcium carbonate be precipitated in continuously operating apparatuses. For example, it is suggested in the American patent publication U.S. Pat. No. 4,133,894, that calcium carbonate be precipitated in three sequential, high columns, in which calcium hydroxide sludge, with a drop size of 1-2 mm, is sprayed, using spray jets, from the top of the column into carbon dioxide gas streaming upwards from the bottom of the column. The produced calcium carbonate is collected from the bottom of the third column as fine, <100 nm sized particles. In this case, the calcium hydroxide sludge must also be very diluted, i.e. its dry matter content must be low, approximately 0.1-10%. In the first column, only 5-15% of the calcium hydroxide will carbonate. The majority will carbonate in the second column.

In many applications of precipitated calcium carbonate (PCC) it would be advantageous to be able to use very small calcium carbonate particles, <100 nm in size, which are uniform in quality and nearly uniform in size. These types of applications are needed, for example, in the pharmaceutical, cosmetics, and food industries. The paint, plastics, rubber, pigment and paper industries, including the techno-chemical industry, also find use for this type of calcium carbonate product.

PURPOSE OF THE INVENTION

The purpose of the present invention is to present an improved method and apparatus for producing a calcium carbonate product formed mostly of separate, stabile, and very small, <100 nm sized calcium carbonate particles.

The purpose is thus also to present an improved method and apparatus for producing a calcium carbonate product with a large specific surface area.

The purpose is furthermore to present a method and apparatus, which precipitate calcium carbonate particles from calcium hydroxide rapidly, and which is less dependent on the particle size and/or dry matter content of the calcium hydroxide product used than previous methods have been.

The purpose is thus also to present a method and apparatus which make it possible to maintain a reaction temperature which is lower than normal during the carbonation stage, i.e. during the precipitation of calcium carbonate.

The purpose is furthermore to present a continuously operating method and apparatus which enable simultaneous feeding and use of various additives in the production of calcium carbonate.

The purpose is furthermore still to present a method and apparatus, whereby it is easy to accomplish complete or nearly complete carbonation of a mineral substance, typically calcium hydroxide.

THE INVENTION

In order to achieve the objectives presented above, a method and an apparatus according to the invention are characterized in that which is presented in the characterizing parts of the independent patent claims presented later in this patent application.

The present invention relates to a method and apparatus for producing precipitated calcium carbonate with a small particle size, typically <100 nm, and thus with a large specific surface area, in a continuously operating process. The calcium carbonate particles of the product are mostly separate, stabile, homogenous and uniform in size.

The method typically comprises the continuous feed of calcium hydroxide ($Ca(OH)_2$) as fine drops and/or particles into a gas which contains carbon dioxide and which is inside a precipitation reactor, in order to carbonate the calcium hydroxide, i.e. in order to produce precipitated calcium carbonate ($CaCO_3$) in the precipitation reactor.

In a solution according to the invention, calcium hydroxide or other suitable $Ca^{++}$ ion sources can be used as a reactive mineral substance, from which calcium carbonate is formed by using carbon dioxide. Typically, in a solution according to the invention, calcium hydroxide is fed into the precipitation reactor as a calcium hydroxide sludge, i.e. as calcium hydroxide dispersed in water, such as lime milk, but it can also be fed in as a calcium hydroxide solution. The material is advantageously fed into the reactor through a disintegration and spraying apparatus located in the reactor or in association with it.

The disintegration and spraying apparatus is typically a so-called impact mixer, by which very fine drops and/or particles are formed from the calcium hydroxide sludge or solution. The impact mixer typically operates simultaneously as a precipitation reactor, or as a part of the precipitation reactor; therefore it is also possible to bring calcium hydroxide advantageously in contact with carbon dioxide for initiating carbonation reactions in this reactor. Using the impact mixer, which operates on the principle of a pin mill, it is also possible to mix calcium hydroxide sludge with a high dry-matter content into the carbon dioxide gas.

The disintegration and spraying apparatus is typically fitted at the top section of the precipitation reactor, but it can also be fitted in another location of the precipitation reactor assembly which is suitable for the feeding of calcium hydroxide.

In addition to the calcium hydroxide sludge, a gas containing carbon dioxide which effects precipitation and which may be pure or nearly pure carbon dioxide, or combustion gas, or other, suitable gas containing $CO_2$, is continuously fed into the precipitation reactor. The gas can be fed directly into the precipitation reactor from its bottom section, from the sides or from the top using a separate gas feeding apparatus. The gas containing carbon dioxide is advantageously fed into the precipitation reactor through the top simultaneously with the calcium hydroxide. The gas containing carbon dioxide can be fed into the precipitation reactor through the disintegration and spraying apparatus, in which case the carbonation reactions will already begin in that apparatus. If desired, carbon dioxide gas can, however, be fed using another suitable gas feeding apparatus, and in some other location of the precipitation reactor. In order to maintain the material balance in the precipitation reactor, the material which contains calcium carbonate is also continuously removed from the reactor.

It has now been established, that in order to produce the small particles desired, typically <100 nm in size, or the separate calcium carbonate particles with the large specific surface area desired, it is advantageous to arrange for precipitation to take place in a lowered reaction temperature, below 65° C., typically in 10-65° C., more typically in 30-65° C., most typically in <40° C. The temperature in the precipitation reactor can be maintained at the desired lower level in several different ways.

In a typical method and apparatus according to the invention, a low temperature is maintained in the precipitation reactor by cooling. There are several cooling methods which can be used one at a time or several methods simultaneously. The temperature in the precipitation reactor can thus be lowered by feeding at least some of the calcium hydroxide or other corresponding $Ca^{++}$ ion source into the precipitation reactor at a lowered temperature, by feeding at least some of the carbon dioxide into the precipitation reactor at a lowered temperature, even as dry ice, by means of cooling elements installed in the precipitation reactor, such as a cooling sleeve installed in the precipitation reactor, by circulating the material which contains calcium carbonate, and/or the gas which contains carbon dioxide, from the precipitation reactor into a cooler equipped with a heat exchanger, and then circulating it back to the precipitation reactor from the cooler, by directing the material which contains calcium carbonate, and/or the gas which contains carbon dioxide, from the first precipitation reactor through a cooler into the second precipitation reactor and/or by using another suitable method.

The calcium carbonate material circulated into the cooler from the precipitation reactor can be returned to the same precipitation reactor, or to the next precipitation reactor, through the disintegration and spraying apparatus located therein.

It has now been established, that by regulating the temperature of the calcium hydroxide fed into the precipitation reactor, it is possible to essentially influence the particle size of the calcium carbonate product to be formed. The lower the temperature of the fed calcium hydroxide, the smaller the particles that will be produced. If a small particle size is desired, it is advantageous to feed at least some of the calcium hydroxide, advantageously most of it, into the precipitation reactor at the temperature of <30° C., typically 5-30° C., advantageously 10-20° C., most typically <17° C. When considering technical-economical aspects, it is generally not possible to use very low initial temperatures. Moreover, when a calcium hydroxide sludge is cooled during carbonation reactions, it is possible to obtain even smaller calcium carbonate particles.

Using a solution according to the invention, it is possible to produce a calcium carbonate product, in which the size of the calcium carbonate particles, $d_{50}$, is <100 nm, typically <70 nm, advantageously <40 nm. The specific surface area of the calcium carbonate product, consisting of mostly separate calcium carbonate particles, is >20 m²/g, typically >40 m²/g, advantageously >60 m²/g.

Calcium hydroxide is advantageously fed directly into the precipitation reactor, or through the disintegration and spraying apparatus fitted to the reactor. In the disintegration and spraying apparatus, which operates advantageously on the principle of a pin mill (i.e. it is either a so-called impact mixer or through-flow mixer), the material to be fed into the precipitation reactor is a target of strong impacts or double impacts from high speed rotors equipped with pins, blades or corresponding elements, which disintegrate and spray the material travelling through the apparatus very efficiently. The speed difference of the rings of the adjacent rotors or adjacent rotors and stators is 5-400 m/s, typically 5-200 m/s.

The dwell time of the calcium hydroxide, or other $Ca^{++}$ ion source which is fed into the precipitation reactor, inside the disintegration and spraying apparatus, which operates on the principle of a pin mill, is <10 seconds, typically <2 seconds, and most typically <1 second.

An effective carbonation time, i.e. the time during which the calcium hydroxide, or other corresponding $Ca^{++}$ ion source, is in effective contact with the carbon dioxide gas in the form of a mist and/or drops, is very short in each precipitation reactor according to the invention, generally <1 min, typically <30 seconds, and most typically <10 seconds. A total effective carbonation time is correspondingly longer if there are several sequential precipitation reactors, or if the material is circulated several times through the same precipitation reactor. Efficient and fast disintegration and spraying of the calcium hydroxide sludge or solution, and rapid mixing of the mist into the carbon dioxide gas, enables a very short effective carbonation time, and thus a very short production time for the calcium carbonate product.

A method and apparatus according to the invention may comprise multi-staged carbonation, i.e. a precipitation process in which in the first phase of the process, typically the main phase, calcium carbonate is precipitated from calcium hydroxide in the first precipitation reactor;

the calcium carbonate precipitated in the first precipitation reactor, and the remaining calcium hydroxide, is directed into the second precipitation reactor;

in the second phase of the process, calcium carbonate is precipitated from the second portion, typically the remaining portion, of the calcium hydroxide in the second precipitation reactor, and the calcium carbonate precipitated in the second precipitation reactor and the calcium carbonate directed to the second precipitation reactor from the first precipitation reactor, as well as any eventual remaining calcium hydroxide which was fed into the precipitation reactor, is directed into the third precipitation reactor, or if the calcium hydroxide has been completely used up, the calcium carbonate is discharged from the precipitation process.

A method and apparatus according to the invention enable complete or nearly complete carbonation of calcium hydroxide, so that stabile, separate and, on average, homogenously sized particles are formed. The calcium carbonate product is thus mostly uniform in quality. Essentially no agglomeration takes place in the product, thus the product does not essentially change even over a long period of time.

Now it has been established that the calcium carbonate particles to be formed in a precipitation reactor according to the invention can be kept separate, and their particle size can be controlled, for example,

- by regulating the temperature of the precipitation,
- by regulating the temperature of raw materials,
- by regulating the amount of the fed calcium hydroxide sludge or solution and/or its dry matter content,
- by regulating the amount of carbon dioxide gas
- by regulating the revolution speed of the rotors, the rotor structure, the number of rings and blades, and the blade position of the disintegration and spraying apparatus, and/or
- by using a suitable additive.

By regulating the dry matter content of the calcium hydroxide sludge or the concentration of the calcium hydroxide solution, it is possible to influence the dry matter content of the calcium carbonate to be formed in the precipitation reactor. The dry matter content of the precipitated calcium carbonate is typically regulated to <30%, more typically to 10-20%.

Characteristics of the calcium carbonate to be produced, such as particle size, crystal shape, specific surface area, separateness and/or uniformity, can also be affected by using various additives. In some cases, it is possible to reduce cooling of the precipitation reactor with the use of additives. The additives may also be used in order to obtain yet a smaller particle size.

Thus, in addition to calcium hydroxide and carbon dioxide, some polyol, for example sorbitol, can be fed into the precipitation reactor. Polyol can be added

- to the calcium hydroxide sludge to be fed into the precipitation reactor, or to the extinguishing water used for producing this sludge,
- directly into the precipitation reactor, for example, into the disintegration and spraying apparatus and/or
- to the material containing calcium carbonate which is discharged from the precipitation reactor.

Polyol, such as sorbitol, enable the formation of small calcium carbonate particles, and it also affects their surface-chemical properties. The addition of polyol also enables the formation of very small particles with less cooling, possibly without any cooling at all. Polyol is typically added in the percentage of 0.1-3%, more typically 1-2% of the product.

The characteristics of a calcium carbonate product produced according to the invention can also be affected by using various additives, such as fatty acid compounds, typically stearin acid or resin acid. In addition, other additives, such as dispersing agents, can be used.

Now it has been recognized, that by feeding a reactive mineral substance, such as lime milk, according to the invention, in the form of a very fine mist into carbon dioxide gas, which effects precipitation, the reactive mineral substance and the gas effecting the precipitation can be caused to mix with each other remarkably easily, and very efficiently for the precipitation of calcium carbonate. It is even possible to obtain complete carbonation in a short reaction time period, i.e. quickly.

The precipitation of calcium carbonate (PCC) from calcium hydroxide starts immediately and the reactions take place remarkably quickly between the calcium hydroxide and the carbon dioxide. By regulating the temperature of the fed mineral substance, the reaction temperature, the temperature or the consistency of the fed gas, by using a method and an apparatus according to the invention, characteristics such as the specific surface area and the particle size of the calcium carbonate being formed can be controlled.

It is assumed that the reactions occur faster and more efficiently the more finely that the mineral substance can be dispersed, i.e. the more finely that it is fragmented when feeding it into the precipitation reactor. When using a calcium hydroxide solution, the material can be disintegrated into especially small drops. The efficiency of spraying can also be affected by the constructions of the disintegration and spraying apparatus and the precipitation reactor.

According to the invention, the temperature during precipitation can thus be adjusted, lowered, so that the formed calcium carbonate particles will stay separated, that is, they will not have any particular tendency to adhere to each other. The same result, separated calcium carbonate particles, is also achieved by using additives. The addition, for example, of polyols, such as sorbitol, will reduce the tendency of the particles to adhere to each other.

Using a disintegration and spraying apparatus which operates on the principle of a pin mill, such as an impact mixer or through-flow mixer, it is possible to feed a mineral substance, i.e. calcium hydroxide, and a gas which effects precipitation continuously and simultaneously into the precipitation reactor. The mineral substance solution will be dispersed into the precipitating gas as very fine drops or particles which form a mist-like gas suspension, in which the gas and the reactive mineral substance used for precipitation are activated and very efficiently mixed together. Using a solution according to the invention, the substances participating in the precipitation process are homogenized as a gas suspension, in which the reactions between different components can take place instantly.

Using an apparatus which operates on the principle of a pin mill, the material being fed into the precipitation reactor can be directed into the gas inside of the precipitation reactor which contains carbon dioxide by sequential, repetitive impacts, double impacts, shear forces, turbulence, over and under pressure pulses, or other corresponding forces which disintegrate the mineral substance into very small, <200 μm particles and fine mist.

An apparatus which operates on the principle of a pin mill comprises several, typically 3-8, most typically 4-6, coaxial rings equipped with blades or the like, of which at least every other ring operates as a rotor, and the adjacent rings as stators, or as rotors rotating in opposite directions or in the same directions at different speeds. The ring speeds of the rotors may be 5-250 m/s. The speed difference between the adjacent rotors may be 5-400 m/s, typically 5-200 m/s. Mills or mixers operating according to this principle have been presented earlier in Finnish patent publications 105699 B, 105112B and in WO publication 96/18454.

In an apparatus which operates on the principle of a pin mill, the mineral substance is typically guided with the help of the rotors and eventual stators to move radially outwards. The extension of the rotor and eventual stator rings from the rings' centre outwards produces a difference in pressure between the inlet, i.e. the centre, and the outlet, i.e. the outer ring in the through-flow mixer. The pressure decreases outwards from the centre. The created pressure difference assists in conveying the mineral substance through the apparatus. The blades, or the like, fitted on the rings of the apparatus can target both impacts and double impacts to the outward-flowing material and create shear forces, turbulence and under and overpressure pulses, which grind, or disintegrate and spray the material. An apparatus which operates on the principle of a pin mill is able to efficiently handle mineral flows of both high and very low dry matter contents to suit precipitation. Operation of the apparatus is easy to regulate. Thus, in a precipitation reactor according to the invention, it is possible to precipitate mineral substances of different dry matter contents, such as <30%, typically 10-25%.

A method and apparatus according to the invention make it possible to freely select the conditions, such as the raw materials, the feeding proportions of the raw materials, the pH, the pressure and the temperature, that are best suited for each process. A solution according to the invention does not set any limits for these conditions.

In addition to the reactive material used for precipitation, typically calcium hydroxide, other substances, for example ones suitable for the further processing of the precipitated calcium carbonate, can be fed into the precipitation reactor.

Additives suited for the surface treatment of particles can be added to the mineral substance before it enters the precipitation reactor, while it is in the precipitation reactor or after it exits the precipitation reactor; for example, additives which affect the hydrophobation of surfaces, particle growth or the capacity of the particles to remain separate from one another. Typical additives include polyols, such as sorbitol, sugar, fatty acids, such as stearin acid, resin acid, phosphoric acid, dispersing substances, such as water solutions of sodium and ammonium salts of acrylic polymers. Additives to be used or some of them can be fed into the precipitation reactor simultaneously.

The invention shall now be described in more detail with reference to the attached figures, in which.

Figure 1:
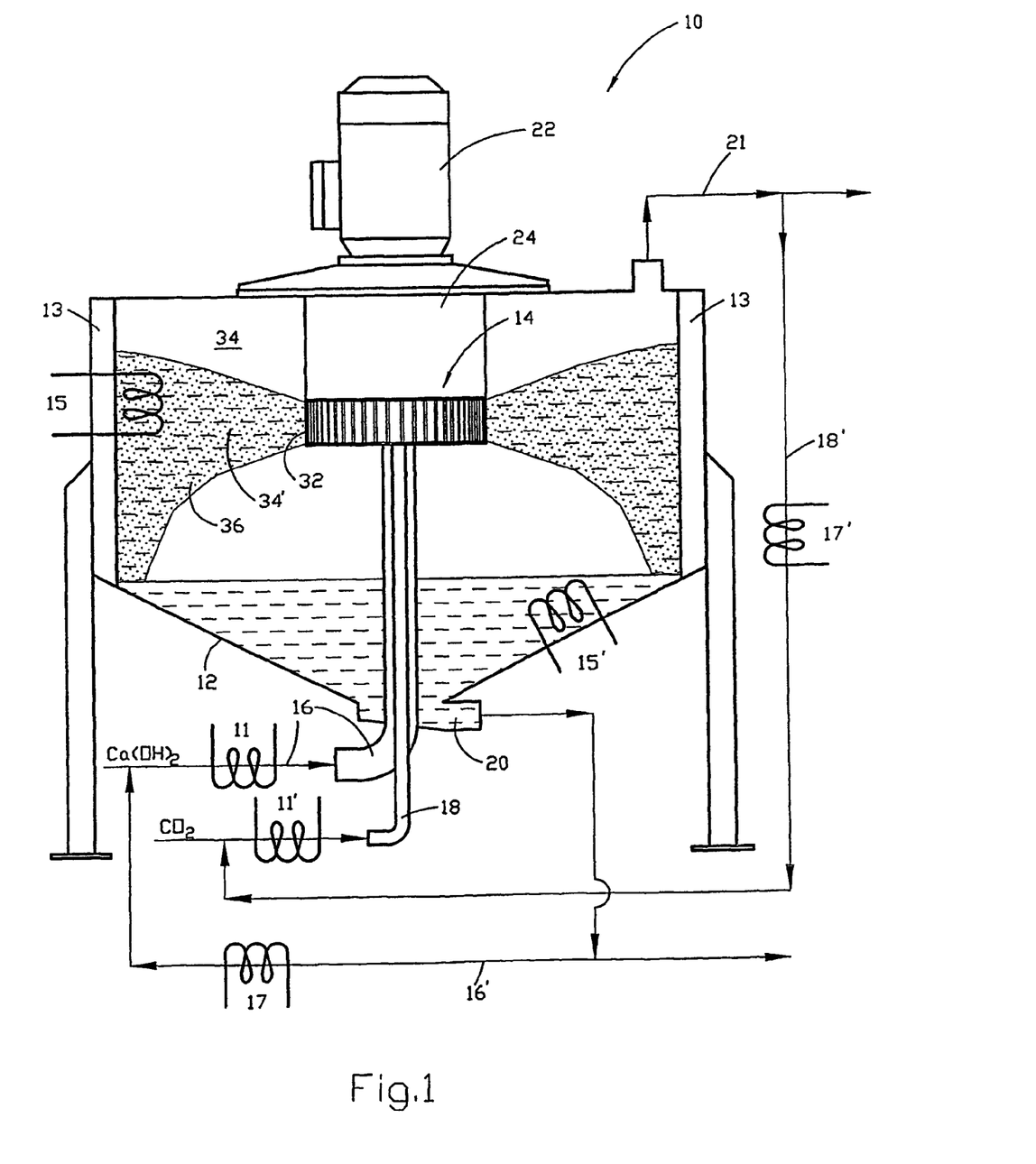
FIG. 1 illustrates schematically and as an example, a vertical cross-section of a precipitation reactor according to the invention.

FIG. 1 illustrates a continuously operating precipitation reactor 10 according to the invention, comprising a precipitation vessel 12, a disintegration and spraying apparatus 14 fitted in the precipitation vessel, a feed pipe 16 for the calcium hydroxide sludge, a feed pipe 18 for the precipitation-effecting carbon dioxide gas, and a discharge pipe 20 for the calcium carbonate suspension. The apparatus additionally consists of an actuator 22, including the bearing and sealing assembly 24 between the actuator 22 and the apparatus 14.

The material containing calcium hydroxide, the calcium hydroxide sludge, which is to be fed into the precipitation reactor, can be cooled according to the invention before being fed into the precipitation reactor. For example, a cooler 11 which will cool the sludge to the desired temperature can be fitted into the feed pipe 16 for the calcium hydroxide sludge.

Similarly, the carbon dioxide gas can be cooled as desired using a cooler 11' before it is fed into the disintegration and spraying apparatus 14.

The precipitation reactor 10 can be equipped with a cooling sleeve 13, as illustrated in FIG. 1, according to the invention, which can surround nearly the whole apparatus, as illustrated in the figure, or only part of it. The cooling sleeve 13 is equipped with some conventional cooling method which is not presented here in more detail.

Additionally, or alternatively, one or several separate coolers 15, which are in contact with the material at the top of the reactor, and/or a cooler 15', which is in contact with the calcium carbonate material at the bottom of the reactor, can be fitted to the precipitation reactor.

Additionally, or alternatively, circulation of the material containing calcium carbonate can be arranged in the precipitation reactor from the discharge pipe 20, through a pipe 16', to the feed pipe 16 which leads to the disintegration and spraying apparatus 14. The pipe 16' is equipped with a cooler 17. The material can be returned directly to the precipitation vessel if desired, for example, to its bottom. The circulating material is cooled in the cooler 17 and is returned as a cooling agent into the precipitation reactor.

Figure 2:
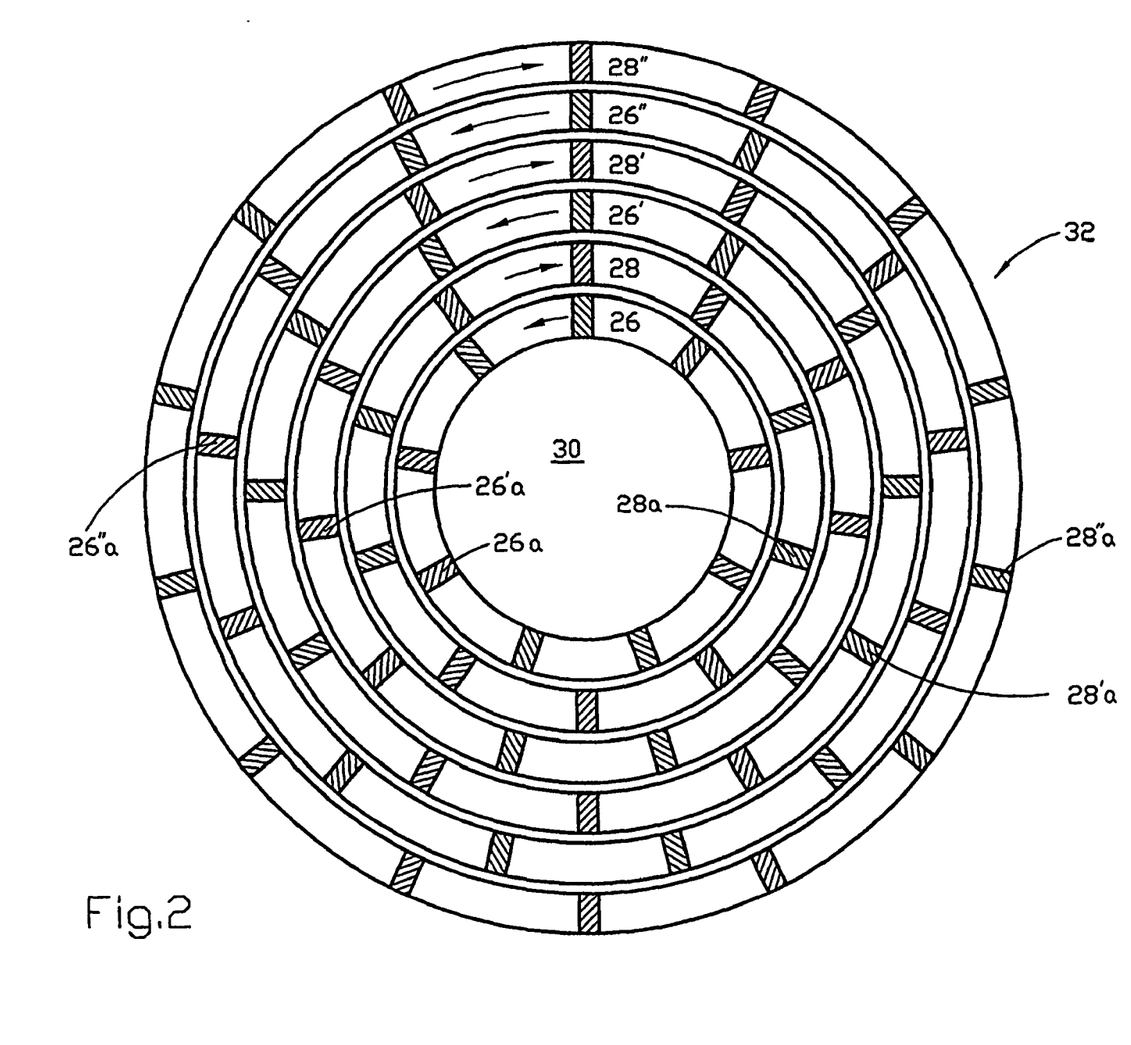
FIG. 2 illustrates schematically and as an example, a horizontal cross-section of a disintegration and spraying apparatus fitted into the precipitation reactor presented in FIG. 1.

A disintegration and spraying apparatus 14 fitted in the precipitation reactor, a horizontal cross-section of which is presented in FIG. 2, is an impact mixer or through-flow mixer operating on the principle of a pin mill, which consists of 6 coaxially arranged rings 26, 26', 26", 28, 28', 28" equipped with blades 26a, 26'a, 26"a, 28a, 28'a, 28"a. In the apparatus 14, the calcium hydroxide sludge to be fed into the precipitation reactor, and other eventual solid substance, is disintegrated into small fragments, liquid drops and/or solid particles, and is fed from the apparatus 14 as a mist-like material into the precipitation vessel 12. The dwell time in the disintegration and spraying apparatus is very short, <10 seconds, typically <2 seconds, most typically even less than 1 second.

As the arrows presented in FIG. 2 indicate, the first rings 26, 26', 26" of the disintegration and spraying apparatus 14 operate as rotors which, in the case presented in the figure, rotate counter-clockwise. The second rings 28, 28', 28" also, adjacent to the first rings, operate as rotors, which, however, in the case presented in the figure, rotate clockwise. The speed difference between the rings of the rotors rotating in opposite directions is 5-400 m/s, typically 5-200 m/s. Blades 26a, 26a', 26a" and 28a, 28a', 28a", which are mounted on the rings, encounter the calcium hydroxide sludge travelling through the apparatus radially outwards, making it a target of repeated impacts and double impacts. Simultaneously, as the blades approach each other, overpressure is generated between the blades of the adjacent rotors, and underpressure is generated when the blades draw apart from each other. The pressure differences very quickly generate over and underpressure pulses in the sludge. Moreover, at the same time, shear forces and turbulence are also generated in the material travelling through the apparatus 14.

Calcium hydroxide sludge, and other eventual substance, is fed through the pipe 16, as presented in FIG. 1, to the centre section 30 of the disintegration and spraying apparatus 14, from which the sludge travels radially outwards towards the open outer edge 32 of the outermost ring 28" by the effect of the rotor blades and by the pressure difference created between the centre and the outer ring of the apparatus. The calcium hydroxide sludge, and other eventual substance, can also be fed into the apparatus 14 between the rings if desired. The calcium hydroxide and other eventual substances can be fed in to the apparatus 14 through separate pipes if desired, in which case they do not come in contact with one another until they are in this apparatus.

Impacts and double impacts, shear forces, turbulence and under and overpressure pulses generated by the rotor blades, rotating in opposite directions, disintegrate the calcium hydroxide sludge to very fine fragments, liquid drops and solid particles. In a solution according to the invention, however, the material is able to flow a relatively open route through the rings, and thus there is no risk of blocking in the apparatus.

In the solution according to the invention presented in FIGS. 1 and 2, the gas effecting the precipitation, $CO_2$, is directed through a pipe 18 to the centre section 30 of the rings of the disintegration and spraying apparatus 14. Additionally, or alternatively, the gas effecting the precipitation can be fed between the rings if desired. From this centre location 30, or from the space between the rings, the gas flows radially outwards, generating, in both the apparatus 14 and in the precipitation vessel 12 around it, a gas space 34 containing the gas which effects the precipitation. The gas is discharged through a pipe 21, located on the top section of the precipitation reactor. Some of the discharged gas can be circulated back to the precipitation reactor through a pipe 18'. The pipe 18' is equipped with a cooling device 17'. Precipitation reactions already begin in the disintegration and spraying apparatus, as the gas comes in contact with the calcium hydroxide sludge or other mineral substance.

When treated in the disintegration and spraying apparatus 14, the calcium hydroxide sludge forms very fine drops and particles which will be dispersed from the apparatus 14 to a section 34' of the gas space surrounding the apparatus. Fine drops and particles are hurled out of the apparatus 14, mainly from its outer ring area, as a mist-like flow 36. Precipitation reactions outside the feed apparatus may continue for a relatively long time as fine drops and particles disperse widely in the precipitation vessel 12. Precipitating calcium carbonate and possibly some unprecipitated calcium hydroxide lands on the bottom of the precipitation vessel and is discharged from the vessel through the pipe 20.

The size, shape, width and height of the precipitation vessel 12 can be selected such that the drops and particles which are hurled out of the feed apparatus remain in the gas space 34' of the precipitation vessel for a dwell time which is as appropriate as possible. For example, increasing the height of the precipitation reactor 12, making it tower-like, or increasing its diameter, increases the dwell time of the calcium hydroxide sludge.

Processes in the precipitation reactor 10 may also be regulated, for example, by adjusting the number of rings, the distance between the rings, the distance between the blades on each ring and the dimension and position of the blades on the disintegration and spraying apparatus 14.

Figure 3:
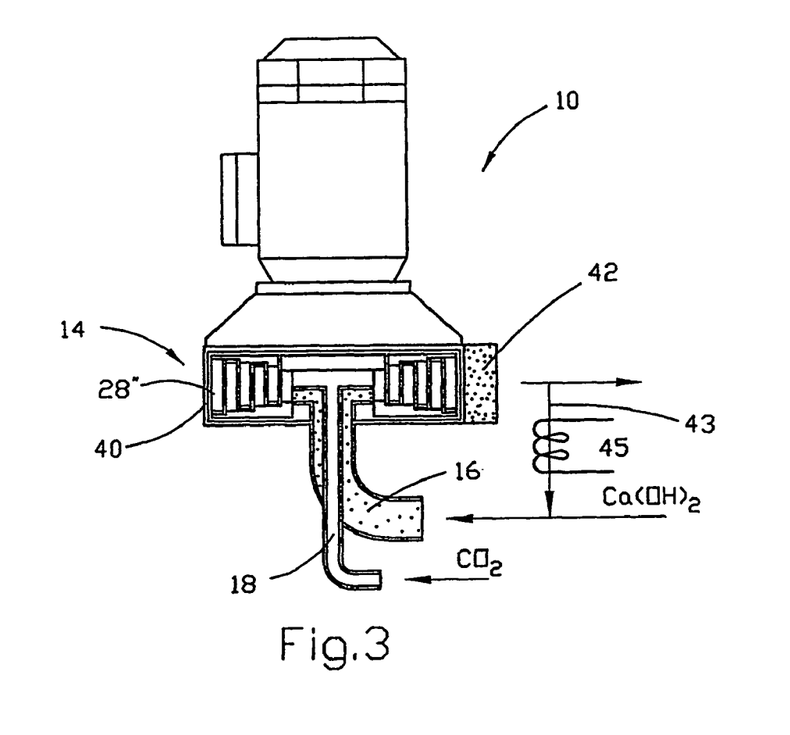
FIG. 3 illustrates schematically and as an example, a vertical cross-section of a second precipitation reactor according to the invention.
Figure 4:
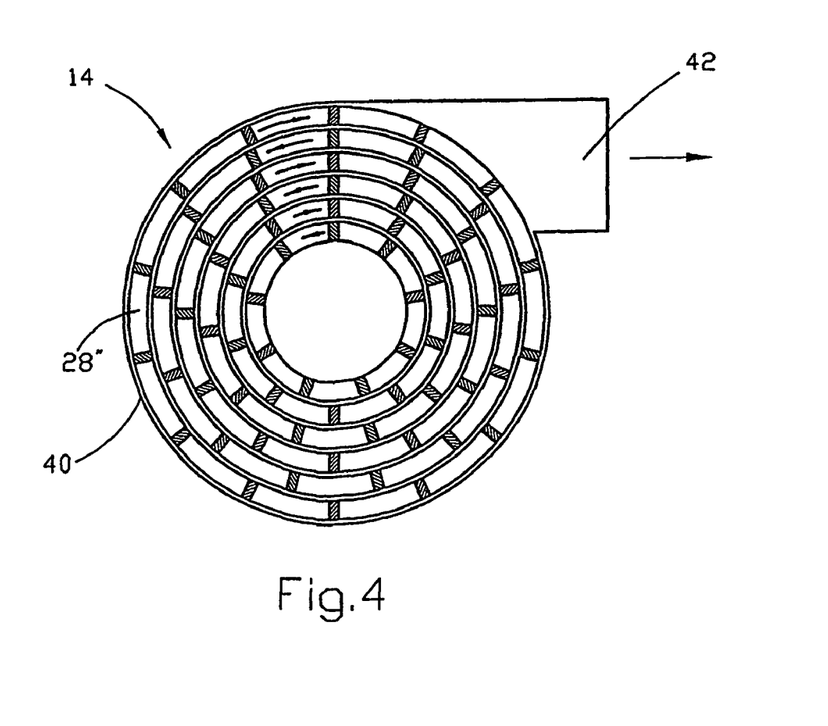
FIG. 4 illustrates schematically and as an example, a horizontal cross-section of the disintegration and spraying apparatus for the type of precipitation reactor presented in FIG. 3.

FIGS. 3 and 4, which illustrate a second precipitation reactor according to the invention, with its disintegration and spraying apparatus 14, use the same reference numbers as presented in FIGS. 1 and 2 where applicable. The second precipitation reactor 10, presented in FIG. 3, according to the invention, differs from the apparatus presented in FIGS. 1 and 2, chiefly such that the reactor comprises a disintegration and spraying apparatus 14 equipped with a closed outer ring 32, which, at the same time, forms the whole precipitation reactor. The precipitation reactor does not include a separate precipitation area extending outside the disintegration and spraying apparatus. The solution presented in FIGS. 3 and 4 is suitable for use, for example, when the precipitation reactions may be assumed to have already been completed as desired in the gas space of the disintegration and spraying apparatus, or if there are several reactors.

In the disintegration and spraying apparatus presented in FIGS. 3 and 4, the outermost ring 28" is surrounded by a housing 40 which closes the ring. The housing comprises a discharge opening 42 for discharging the precipitated calcium carbonate from the apparatus 14. The precipitated calcium carbonate may be directed from the discharge opening 42 for further treatment or processing, or it can be circulated through the pipe 43, into the pipe 16, and back to the disintegration and spraying apparatus 14. The pipe 16 may be equipped with a cooler 45.

Figure 5:
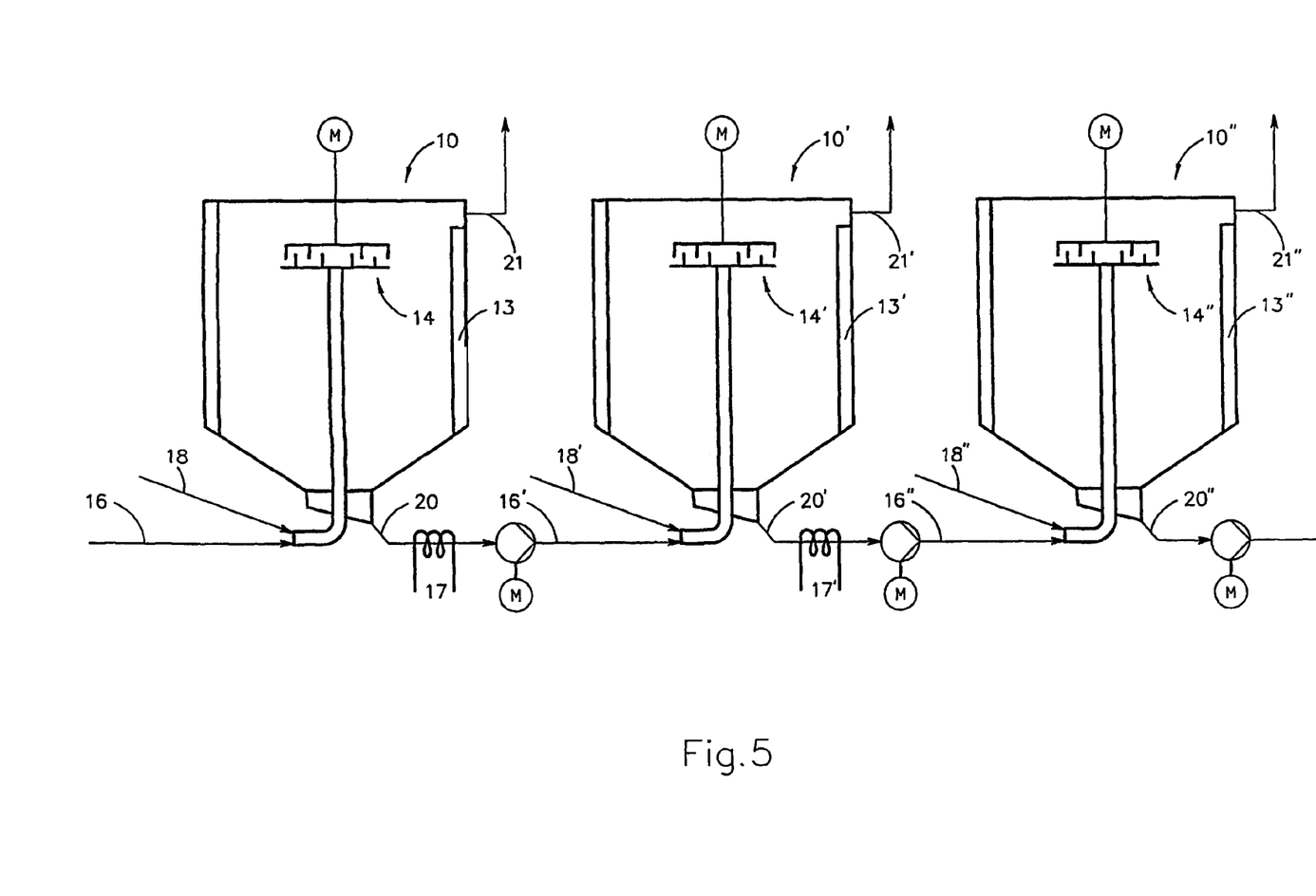
FIG. 5 illustrates schematically and as an example, a vertical cross-section of a precipitation reactor group according to the invention.

Two or more of both types of precipitation reactors presented in FIGS. 1 and 3 can be arranged in a sequential series. FIG. 5 illustrates a group of three precipitation reactors of the type presented in FIG. 1. The reference numbers are the same as in the previous figures where applicable.

FIG. 5 illustrates three precipitation reactors 10, 10' and 10" where calcium hydroxide is brought into contact with carbon dioxide gas in order to carbonate the calcium hydroxide into calcium carbonate, i.e. to precipitate $CaCO_3$. The reactors are connected sequentially, such that the suspension of the precipitated carbonate and the unprecipitated calcium hydroxide is directed from the discharge pipe 20 of the first reactor 10 to the feed pipe 16' of the second reactor 10'. Correspondingly, the suspension containing a larger amount of carbonated calcium carbonate is directed through the discharge pipe 20' of the second reactor 10' into the feed pipe 16" of the third reactor 10".

The gas containing carbon dioxide is led to each reactor through the pipes 18, 18', 18". The gas containing carbon dioxide is led through the feed pipe 18 to the first reactor 10, which induces precipitation (carbonation) and the formation of a carbonate in the disintegration and spraying apparatus 14. The same gas, or other gas containing carbon dioxide, can be led to the second and third precipitation reactors 10', 10" through the pipes 18', 18" to complete the precipitation reactions (carbonation). The gas is removed from the reactors through discharge pipes 21, 21', 21".

According to the invention, in the case presented in FIG. 5, coolers 17 and 17' are fitted to the discharge pipes 20 and 20' to cool the material to be fed into the precipitation reactors 20' and 20".

Break or storage tanks can be fitted between the precipitation reactors 10, 10' and 10", where the product containing calcium carbonate coming from the previous precipitation reactor can be stored for a while, for some minutes, or even for a longer time.

Figure 6:
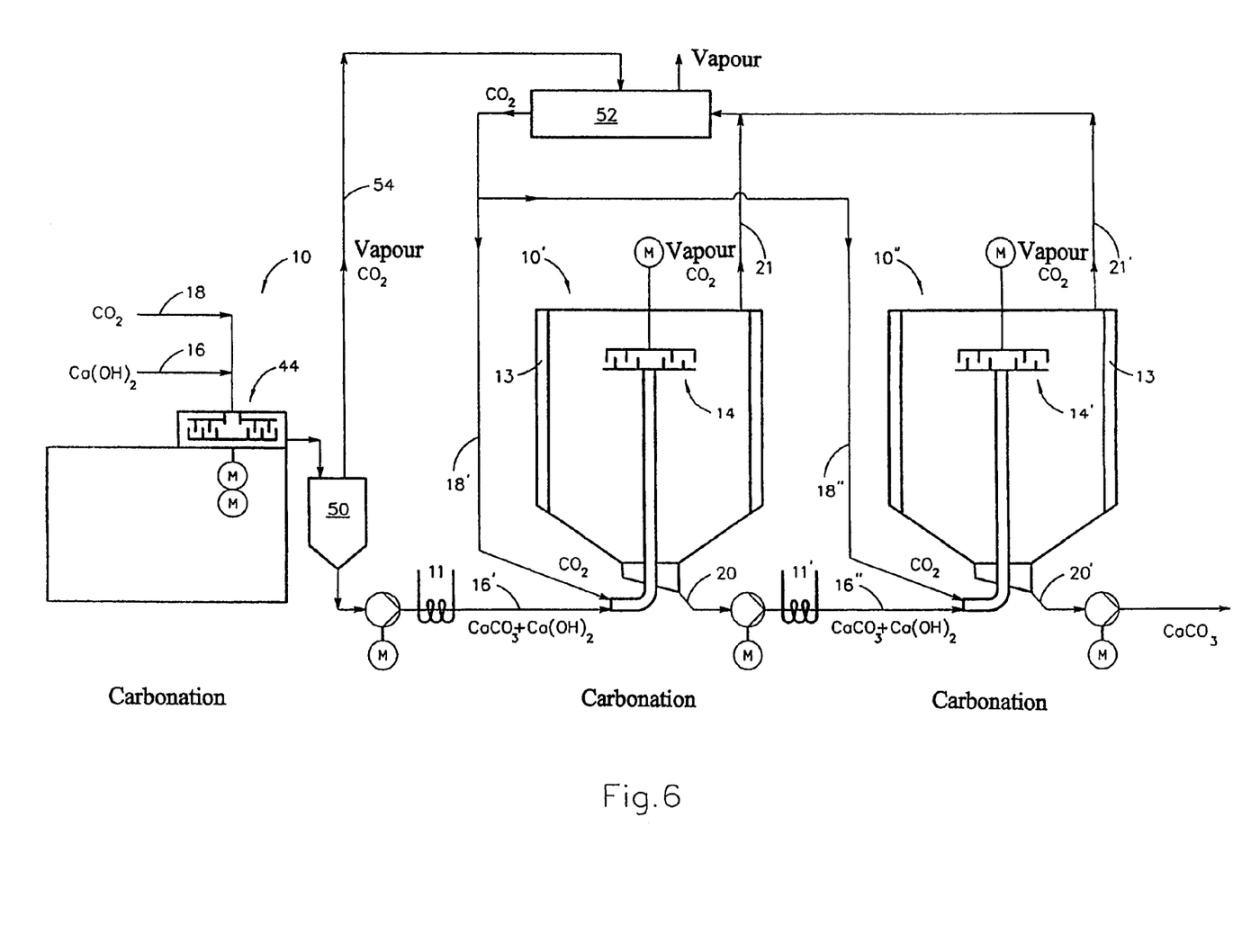
FIG. 6 illustrates schematically and as an example, a vertical cross-section of a second precipitation reactor group according to the invention.

FIG. 6 illustrates a second precipitation reactor group, which comprises one sequentially fitted precipitation reactor 10 of the type presented in FIG. 3, and two precipitation reactors 10', 10" of the type presented in FIG. 1 which are fitted to the series.

Calcium hydroxide is led through the pipe 16, and gas containing carbon dioxide is led through the pipe 18 to the first precipitation reactor 10, i.e. to the disintegration and spraying apparatus 44. Material exiting from the precipitation reactor 10 is directed into a gas separator 50, where the gas containing carbon dioxide is separated from the material containing calcium hydroxide and calcium carbonate. The gas containing carbon dioxide and vapour is directed through the pipe 54 into a washing and cooling apparatus 52, from where the gas containing carbon dioxide is directed through the pipe 18' to the disintegration and spraying apparatus of the second precipitation reactor 10'. The material containing calcium hydroxide and calcium carbonate is directed from the gas separator through the pipe 16', which is equipped with a cooler 11, to the disintegration and spraying apparatus 14 of the second precipitation reactor.

The gas, typically containing vapour and carbon dioxide, is removed from the top section of the precipitation reactor 10' through the pipe 21. The gas is led for treatment in the gas washing and cooling apparatus 52. In the apparatus 52, some of the treated gas containing carbon dioxide is circulated through the pipe 18' back to the precipitation reactor 10', and the rest 18" is directed to the next precipitation reactor 10". The precipitated calcium carbonate and the unprecipitated calcium hydroxide, gathering at the bottom section of the precipitation reactor, is discharged to the discharge pipe 20.

The third precipitation reactor 10", as presented in FIG. 6, operates mainly on the same principle as the second precipitation reactor 10'. The material, which has been removed from the bottom of the second reactor 10' to the pipe 20, and which contains calcium hydroxide in addition to the precipitated calcium carbonate, is directed through the pipe 16" along the bottom to the disintegration and spraying apparatus 14' of the third reactor 10". From the washing and cooling apparatus 52, the gas containing carbon dioxide is directed to the third reactor 10" through the pipe 18". Completely precipitated calcium carbonate is discharged from the bottom of the third reactor 10" through the pipe 20'. The gas is removed from the top section of the third reactor 10" through pipe 21' and is led to the washing and cooling apparatus 52 for further circulation.

Figure 7:
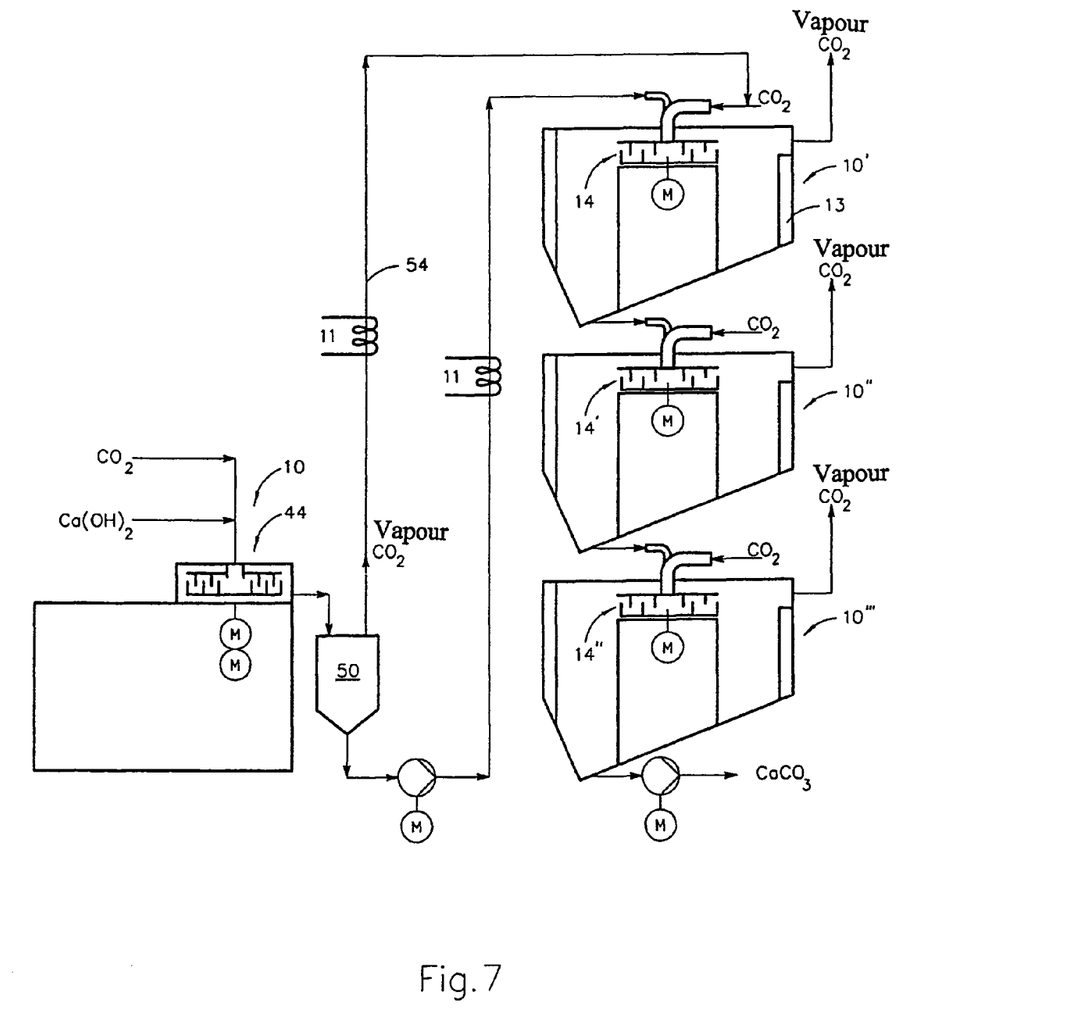
FIG. 7 illustrates schematically and as an example, a vertical cross-section of a third precipitation reactor group according to the invention.

FIG. 7 illustrates a precipitation reactor group comprising one precipitation reactor 10 of the type presented in FIG. 3 and three precipitation reactors 10', 10", 10''' of the type presented in FIG. 1 which have been fitted to the series. The first precipitation reactor operates as the precipitation reactor presented in FIG. 6. The three precipitation reactors 10', 10", 10''', as presented in FIG. 1, are fitted on top of each other and the calcium hydroxide sludge is fed from the top to the feed apparatuses 14, 14', 14" located in the precipitation reactors. The second reactor 10' is on the top and the third reactor 10''' is on the bottom, whereupon the material containing the calcium hydroxide and the calcium carbonate flows mostly downwards when travelling through the reactors.

EXAMPLES

The purpose of the experiments presented in the following examples is to present how it is possible to affect to the specific surface area and particle size of the precipitated calcium carbonate by applying a solution according to the invention. The purpose is only to illustrate, not to limit the invention.

The results of the experiments KP1-KP4 are presented in the following section. In these experiments, according to the invention, precipitation was carried out on the calcium hydroxide sludge using a gas containing carbon dioxide. In experiments KP1 and KP2, the calcium hydroxide sludge was cooled to 13° C. before initiation of carbonation. Moreover, in experiment KP2, the sludge to be carbonated was cooled dining carbonation. In experiments KP3 and KP4, the initial temperature of the calcium hydroxide sludge was 30° C. In experiment KP4, sorbitol was added to the calcium hydroxide sludge.

In all experiments, the dry matter content, quality of the $Ca(OH)_2$ and the composition of the gas containing $CO_2$ were the same.

The dry matter content of the $Ca(OH)_2$ sludge was adjusted so that the dry matter of the final product, the precipitated calcium carbonate, was 17%.

KP1. The temperature of the $Ca(OH)_2$ sludge was adjusted to 13° C., after which the sludge was pumped through the precipitation reactor. The excess amount of gas containing $CO_2$ was fed into the apparatus. As the $Ca(OH)_2$ sludge was being fed into the precipitation reactor, it formed very fine mist-like drops which were mixed with the gas containing $CO_2$. This treatment was repeated three times, after which the pH of the obtained precipitated calcium carbonate, PCC-sludge, was 6.8. During the treatment, the temperature rose to 55° C.

KP2. The second experiment was conducted as the first experiment, except that the sludge was cooled during the process, so that its temperature did not exceed 27° C. After the third treatment, the pH of the PCC sludge was 6.9.

KP3. The third experiment was conducted as the first experiment, except that the temperature of the $Ca(OH)_2$ sludge was 30° C. at the beginning of the experiment. During the treatment, the temperature of the sludge rose to 61° C. After the treatment, the pH of the sludge was 6.8.

KP4. The fourth experiment was conducted as the third experiment, except that 1.5% sorbitol, as calculated from the PCC to be produced, was added to the $Ca(OH)_2$ sludge. During this treatment the temperature of the sludge rose to 60° C. After the third treatment, the pH of the sludge was 6.9.

A specific surface area was measured (using a Micrometrics Flowsorb III device) from the samples thus produced, and the average size of the particles was determined using electron microscope images. The results are presented in Table 1.

TABLE 1

| | Experiment | | | | |
| --- | --- | --- | --- | --- | --- |
| | KP1 | KP2 | KP3 | KP4 | |
| cooling | — | yes | — | — | |
| initial temperature | 13 | 13 | 30 | 30 | ° C. |
| max. temperature | 55 | 27 | 61 | 60 | ° C. |
| sorbitol | — | — | — | 1.5 | % |
| $d_{50}$ | 40 | 30 | 50 | 35 | nm |
| specific surface area | 60 | 81 | 48 | 65 | $m^2/g$ |

Experiments KP1 and KP2 demonstrate that by cooling the sludge ($Ca(OH)_2$) being carbonated during the precipitation, it was possible to obtain a calcium carbonate product, in which the particle size was remarkably smaller (30) than without cooling (40). Correspondingly, the specific surface area of the product in KP2 (81) was larger than in experiment KP1 (60).

Experiments KP1 and KP3 demonstrate that in KP1, in which the initial temperature of the $Ca(OH)_2$ sludge was lowered, it is possible to obtain a calcium carbonate product in which the specific surface area is larger and the particle size smaller than in KP3.

Experiments KP3 and KP4 show that it is possible to obtain smaller particles and a correspondingly larger specific surface area when sorbitol is added.

The solution according to the invention has achieved a simple, continuously operating and fast technical-economical method and apparatus for industrially producing a calcium carbonate product formed of very small, <100 nm, and mostly separate particles. The method enables the complete carbonation of calcium hydroxide easily. The reaction time is short, i.e. carbonation is fast, which leads to the formation of small, homogenous particles with a large specific surface area. The process is less dependent on the particle size and dry matter content of the calcium hydroxide input.

The method and apparatus are simple. The main components of the product can typically be added to the process simultaneously, in which case the substances react with each other immediately.

The method and apparatus also lead to an economical final result. The apparatus used is energy efficient with regard to the obtained results. The apparatus converts the fed mineral substance, sludge or a solution containing calcium hydroxide, into very fine drops or particles. In the method, the source material can be calcium hydroxide with a high dry matter content, which also produces a calcium carbonate product with a high dry matter content.

The method allows for a wide variety of variables, which makes it easier to find the correct adjustments for each specific case. Cooling makes it possible to create an even processing temperature if necessary.

Using a polyol such as sorbitol as an additive in association with the carbonation process, it is possible to influence the specific surface area, particle size and/or homogeneity of the calcium carbonate to be formed. In that case, not much cooling is needed, or possibly none at all, for producing the desired calcium carbonate product with a very small particle size. On the other hand, even smaller particles sizes can be obtained using cooling and a polyol addition at the same time.

Also, other additives which directly affect the surface chemical properties of the product can be used.

The invention is not intended to be limited to the examples presented above; on the contrary, it is intended that the invention be broadly adapted within the scope of the claims presented below.

The invention claimed is:

1. A method for producing a calcium carbonate product in one or several sequential precipitation reactors, said method comprising:
    feeding carbon dioxide into a precipitation vessel of a precipitation reactor,
    feeding calcium hydroxide ($Ca(OH)_2$), or other corresponding $Ca^{++}$ ion source, into said precipitation vessel,
    maintaining a temperature in said precipitation vessel of less than 65° C., either
    a) by cooling said precipitation reactor by means of cooling elements, or
    b) by circulating a material which contains calcium carbonate, and/or a gas which contains carbon dioxide, to a cooler from said precipitation vessel and back to said precipitation vessel from said cooler, and
    precipitating calcium carbonate particles having a size of less than 100 nm in said precipitation vessel,
    wherein the calcium hydroxide, or other corresponding $Ca^{++}$ source, is fed to said precipitation vessel through a disintegration and spraying apparatus which is located inside said precipitation vessel, and
    wherein said disintegration and spraying apparatus operates on the principle of a pin mill.

2. The method according to claim 1, wherein the temperature in the precipitation reactor is adjusted
    by cooling at least some of the carbon dioxide prior to feeding the carbon dioxide into the precipitation reactor,
    by cooling at least some of the calcium hydroxide, or other corresponding $Ca^{++}$ ion source, prior to feeding the calcium hydroxide or other corresponding $Ca^{++}$ ion source into the precipitation reactor,
    by arranging a cooling sleeve in the precipitation reactor, and/or
    by leading the material which contains calcium carbonate and/or the gas which contains carbon dioxide from a first precipitation reactor through a cooler to a second precipitation reactor.

3. The method according to claim 2, wherein at least some of the calcium hydroxide is fed into the precipitation reactor at a temperature of <30° C.

4. The method according to claim 3, wherein at least some of the calcium hydroxide is fed into the precipitation reactor at a temperature of 5-30° C.

5. The method according to claim 3, wherein at least some of the calcium hydroxide is fed into the precipitation reactor at a temperature of less than 17° C.

6. The method according to claim 1, wherein the temperature in the precipitation reactor is kept at 10-65° C.

7. The method according to claim 6, wherein the temperature in the precipitation reactor is kept at 30-65° C.

8. The method according to claim 6, wherein the temperature in the precipitation reactor is kept at <40° C.

9. The method according to claim 1, wherein the precipitation reactor operates continuously, whereupon
    at least, calcium hydroxide and carbon dioxide are being fed continuously into the precipitation reactor and
    a material containing calcium carbonate is continuously being removed from the precipitation reactor.

10. The method according to claim 1, wherein at least some of the material which contains calcium carbonate which is removed from a first precipitation reactor is cooled and circulated back to the first precipitation reactor, or is directed to a second precipitation reactor through a disintegration and spraying apparatus operating on the principle of a pin mill.

11. The method according to claim 1, wherein the calcium hydroxide is fed into the precipitation reactor as a calcium hydroxide solution and/or as a calcium hydroxide sludge and wherein
    the drop size and/or particle size of the calcium hydroxide sludge or solution is reduced to a particle size of <200 μm in the disintegration and spraying apparatus, which operates on the principle of a pin mill, by impacts and double impacts which are targeted at the sludge and/or solution and which are generated by pins, blades or corresponding elements which are fitted in the disintegration and spraying apparatus and which are moving at ring speeds of 5-250 m/s.

12. The method according to claim 1, wherein a dwell time of the material which contains calcium hydroxide, and/or the circulating material which contains calcium carbonate, inside the disintegration and spraying apparatus is <10 s.

13. The method according to claim 12, wherein a dwell time of the material which contains calcium hydroxide, and/or the circulating material which contains calcium carbonate, inside the disintegration and spraying apparatus is <2 s.

14. The method according to claim 13, wherein a dwell time of the material which contains calcium hydroxide, and/or the circulating material which contains calcium carbonate, inside the disintegration and spraying apparatus is <1 s.

15. The method according to claim 1, wherein an effective carbonation time of the material which contains calcium hydroxide, and/or the circulating material which contains calcium carbonate, inside the precipitation reactor is <1 minute.

16. The method according to claim 15, wherein the effective carbonation time of the material which contains calcium hydroxide, and/or the circulating material which contains calcium carbonate, inside the precipitation reactor is <30 s.

17. The method according to claim 16, wherein the effective carbonation time of the material which contains calcium hydroxide, and/or the circulating material which contains calcium carbonate, inside the precipitation reactor is <10 s.

18. The method according to claim 1, wherein the carbon dioxide is fed into the precipitation reactor
    through the disintegration and spraying apparatus operating on the principle of a pin mill and/or
    directly into a precipitation vessel of the precipitation reactor through a separate gas feeding apparatus.

19. The method according to claim 1, wherein the method comprises a multi-staged, continuously operating carbonation process in which in a first phase of the process calcium carbonate is precipitated from calcium hydroxide in a first precipitation reactor, after which calcium carbonate precipitated in the first phase of the process and unprecipitated calcium hydroxide is directed from the first precipitation reactor to a second precipitation reactor, and in a second phase of the process, calcium carbonate is precipitated from at least some of the calcium hydroxide which has been directed to the second precipitation reactor, after which calcium carbonate precipitated in the second phase of the process and the calcium carbonate which has been directed from the first precipitation reactor to the second precipitation reactor, and remaining unprecipitated calcium hydroxide, is directed out of the second precipitation reactor, optionally to a third precipitation reactor.

20. The method according to claim 1, wherein the particle size of the precipitated calcium carbonate is controlled by adjusting a dry matter content of the calcium hydroxide fed into the precipitation reactor or reactors by adjusting the dry matter content to <30%.

21. The method according to claim 20, wherein the particle size of the precipitated calcium carbonate is controlled by adjusting the dry matter content of the calcium hydroxide to 10-25%.

22. The method according to claim 1, wherein, in addition to calcium hydroxide and carbon dioxide, some polyol is fed into the precipitation reactor, and wherein the polyol is added to calcium hydroxide sludge to be fed into the precipitation reactor, or to water used to produce this sludge directly to the precipitation reactor through the disintegration and/or spraying apparatus and/or to the material which contains the calcium carbonate which is being discharged from the precipitation reactor.

23. The method according to claim 22, wherein said polyol is sorbitol.

24. The method according to claim 1, wherein one or more additives, which are suitable for surface treatment of particles and affect hydrofobation, growth, or separateness of the particles are added separately or simultaneously to the calcium carbonate prior to the precipitation reactor, in the precipitation reactor and/or after the precipitation reactor.

25. The method according to claim 24, wherein the additive is a member selected from the group consisting of a polyol, sugar, a fatty acid, phosphorous acid and a dispersing agent.

26. The method according to claim 25, wherein said polyol is sorbitol.

27. The method according to claim 25, wherein the fatty acid is sterin acid or resin acid.

28. The method according to claim 25, wherein the dispersing agent is an aqueous solution of sodium or ammonium salts of acrylic polymers.

* * * * *